United States Patent [19]

Snyder et al.

[11] 4,003,547
[45] Jan. 18, 1977

[54] VALVE OPERATOR

[75] Inventors: Francis H. Snyder, Newton; Francis H. Snyder, Jr., Brookfield, both of Conn.

[73] Assignee: Lone Star Industries, Inc., Greenwich, Conn.

[22] Filed: Dec. 13, 1974

[21] Appl. No.: 532,637

Related U.S. Application Data

[63] Continuation of Ser. No. 266,231, June 26, 1972, abandoned, which is a continuation-in-part of Ser. No. 170,088, Aug. 9, 1971, abandoned.

[52] U.S. Cl. ............................ 251/31; 251/58; 91/471; 92/24; 92/134; 92/137; 92/130 A
[51] Int. Cl.² ................ F16K 31/16; F15B 15/26
[58] Field of Search ............ 92/130 A, 134, 24, 25, 92/137, 26; 91/471; 251/58, 73, 294, 66, 31

[56] References Cited

UNITED STATES PATENTS

| | | | |
|---|---|---|---|
| 3,431,031 | 3/1969 | Ike | 92/63 X |
| 3,479,927 | 11/1969 | Woodward | 92/134 X |
| 3,591,127 | 7/1971 | Lugen | 251/73 X |

*Primary Examiner*—Arnold Rosenthal
*Attorney, Agent, or Firm*—Vinson, Elkins, Searls, Connally & Smith

[57] ABSTRACT

An extremely fast-acting valve operator including a piston slidable in a pneumatic cylinder and connected by means of a chain and sprocket with the rotatable actuating shaft of a valve so that rapid movement of the piston imparts a rapid rotation to the shaft to open the valve. The piston is subjected to a high pressure gas but is initially restrained against motion within its cylinder by means of a quick release mechanism whereby release of said mechanism results in the piston undergoing immediate and rapid movement responsive to the expanding gas to thereby rapidly open the valve. This abstract is not to be construed in any way to define or limit the invention set forth below.

22 Claims, 9 Drawing Figures

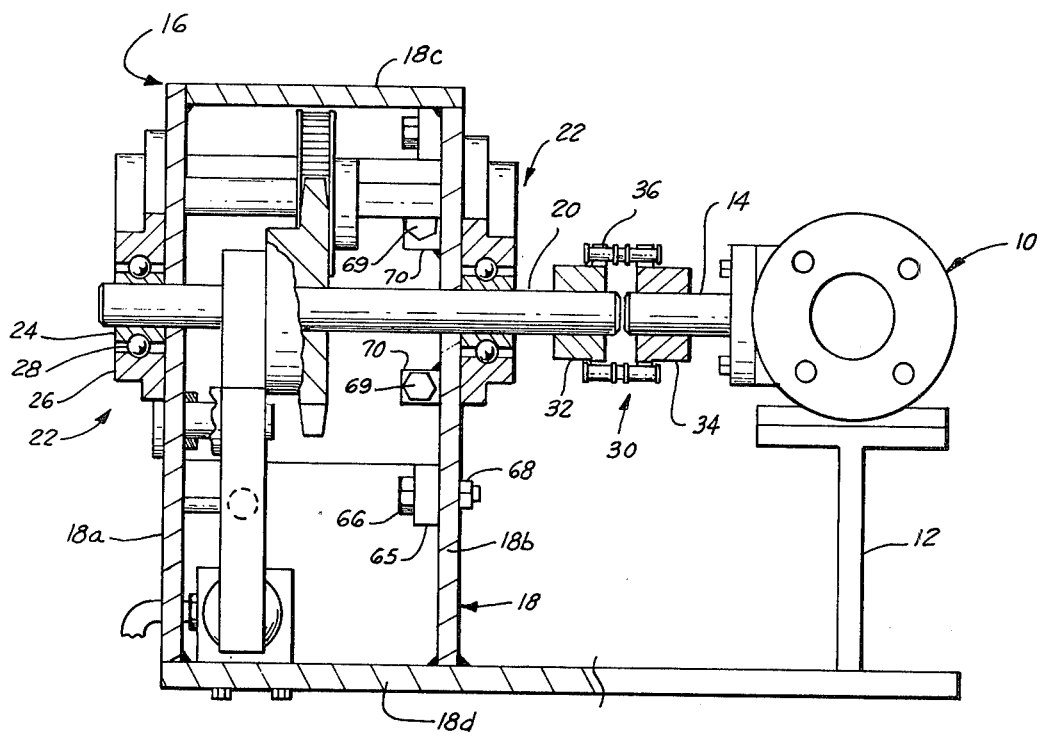
Fig-3
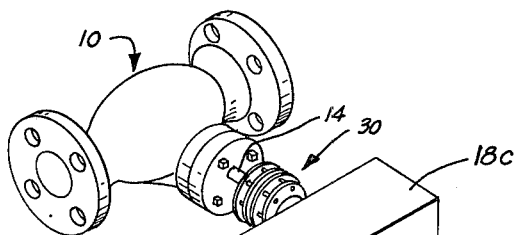
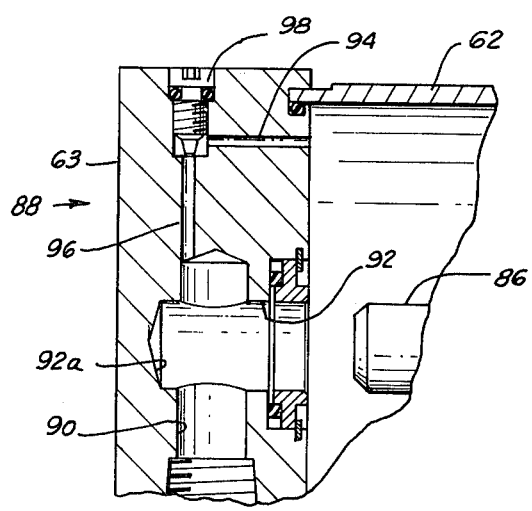
Fig-4
Fig-1
FRANCIS H. SNYDER
FRANCIS H. SNYDER, JR.
INVENTORS
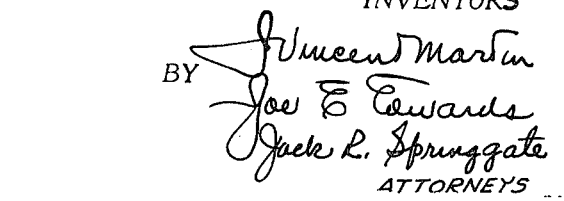
ATTORNEYS

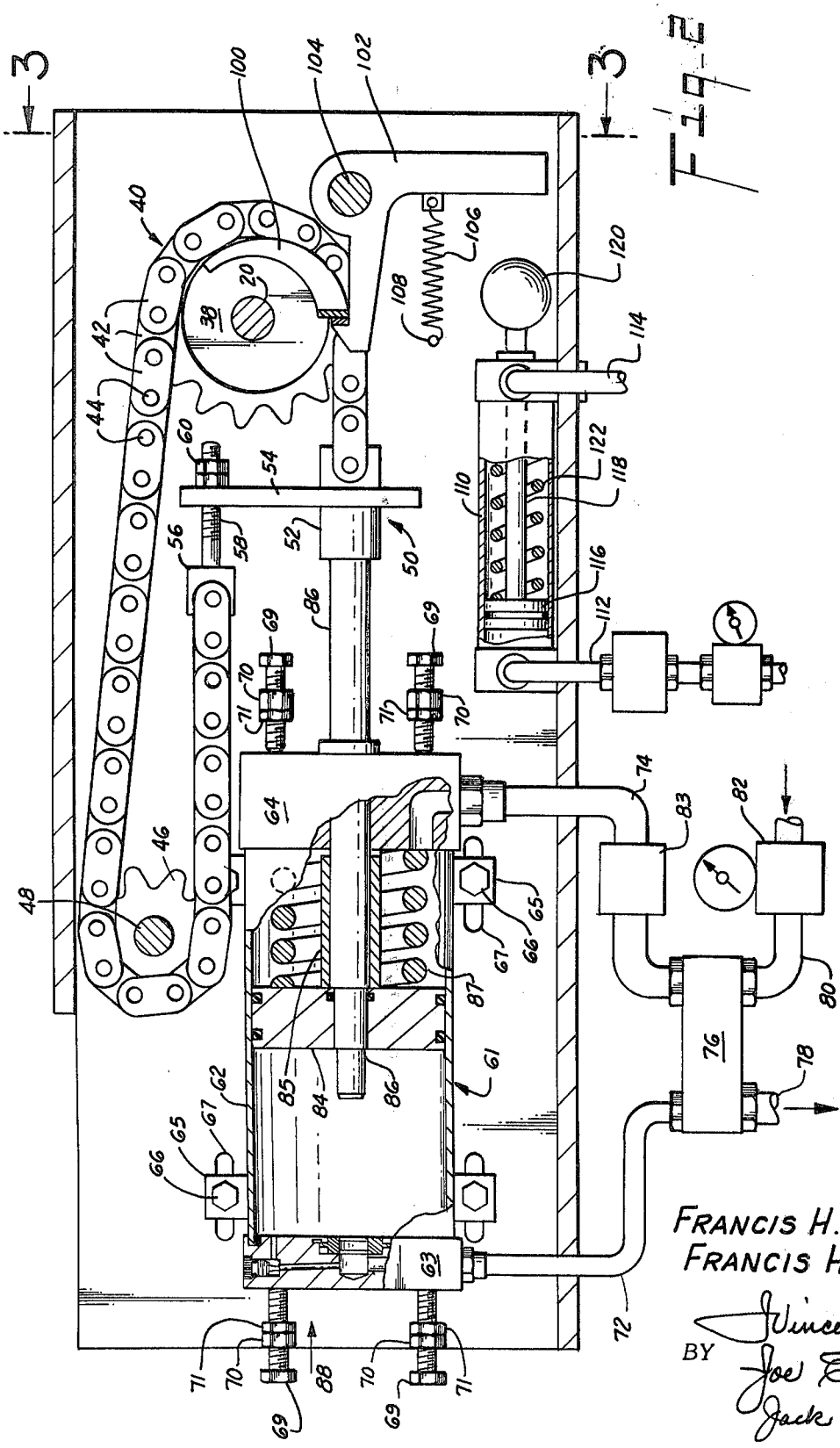

FRANCIS H. SNYDER
FRANCIS H. SNYDER, JR
INVENTORS
BY
ATTORNEYS

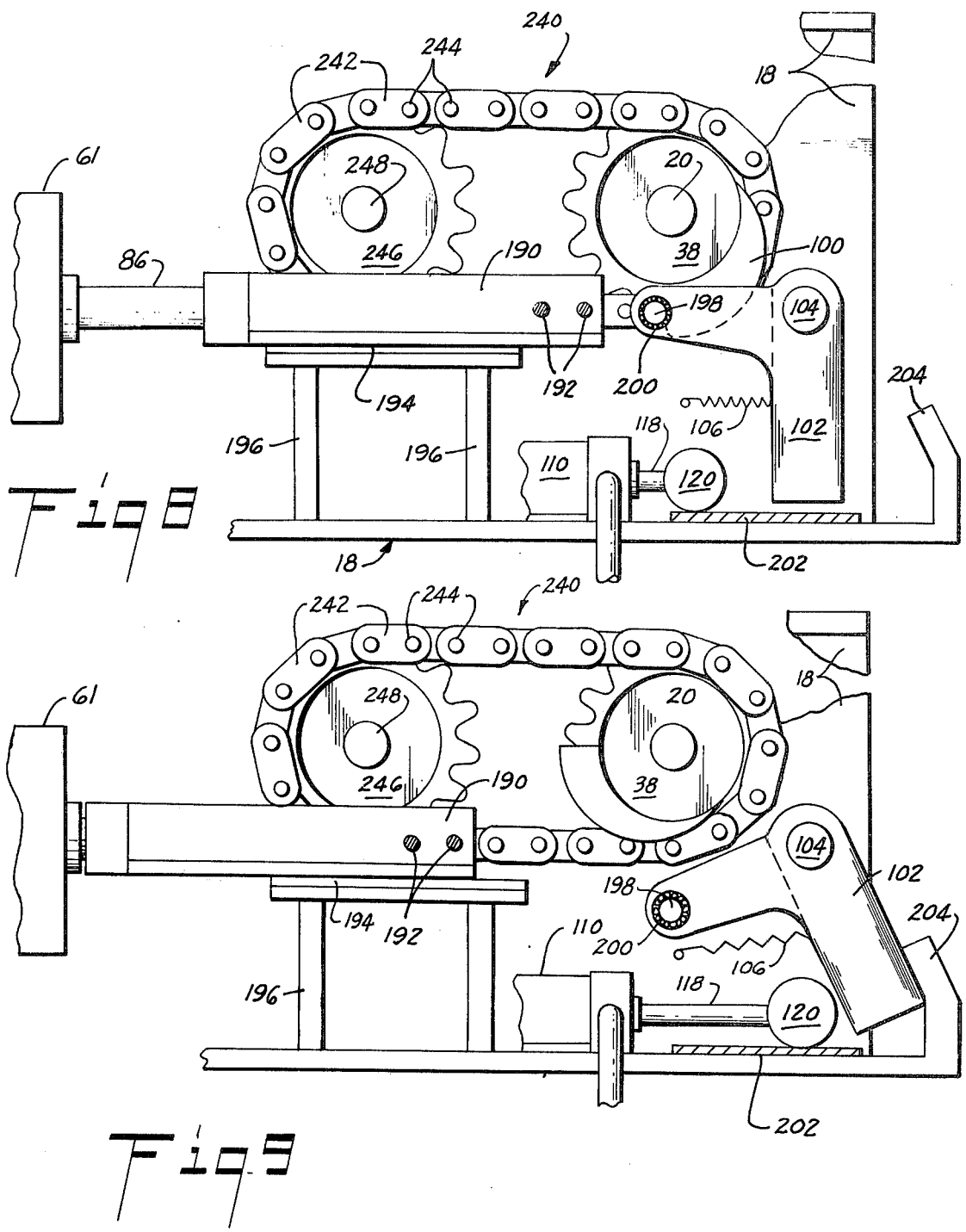

VALVE OPERATOR

This application is a continuation of prior co-pending application Ser. No. 266,231, filed June 26, 1972, which was a continuation-in-part of earlier co-pending application Ser. No. 170,088, filed Aug. 9, 1971, now abandoned.

SUMMARY OF THE INVENTION

This invention relates to valve operators and particularly to valve operators which are very fast-acting. In many instances it is desirable to have a valve which is quick-opening or quick-closing. This is especially true where fast-moving streams of abrasive particles are being handled, since in such an environment the valve is exposed to greatest wear during its movement from a fully closed to a fully open position. Thus, for example, the valve operator of the present invention might find usefulness in a process for processing anisotropic solid substances such as that disclosed in a U.S. Pat. No. 3,257,080 issued June 21, 1966 to F. H. Snyder, or the improvement process disclosed in the copending application of F. H. Snyder, Ser. No. 170,087. Other uses are as a fast safety-shut-off on fuel lines, etc., and for fast-opening of fire-control valves.

It is, accordingly, the primary object of the present invention to provide an extremely quick-acting valve operator.

Another object is to provide a pressure-actuated valve operator which may be "cocked" and restrained in such position, whereby upon the release of the restraining means, immediate and rapid action of the operator occurs.

Another object is to provide a fast-acting valve operator which includes a chain and sprocket connection between the power piston of the operator and a rotatable shaft of the valve so that longitudinal movement of the piston results in rotation of the shaft; said chain encompassing a substantial portion of said sprocket and providing an amplified contact surface with the sprocket to assure proper transmission of power from the power piston to the rotatable shaft.

Another object is to provide such a valve operator which is faster operating than any other presently commercially available, and which may complete one-half of a complete cycle, so as to open or close a valve in approximately 10 milliseconds.

These and other objects and advantages of the invention will be apparent from the drawings, specification, and claims.

BRIEF DESCRIPTION OF THE DRAWINGS

In the accompanying drawings, in which like numerals indicate like parts:

FIG. 1 is an isometric view of a valve operator constructed in accordance with the present invention connected to a valve to be operated;

FIG. 2 is a side view, partly in section and partly in elevation, of the valve operator of FIG. 1;

FIG. 3 is an end elevational view taken along line 3—3 of FIG. 2 and having portions broken away to more clearly show the various parts;

FIG. 4 is an enlarged sectional view of the dashpot in the main pneumatic cylinder of FIG. 2;

FIGS. 8 and 9 are fragmentary side elevational views of the valve operator of FIG. 1 showing an alternate form of the operator means, with the parts shown, respectively, in latching and nonlatching configuration.

DESCRIPTION OF THE PREFERRED EMBODIMENT

Figure 5:
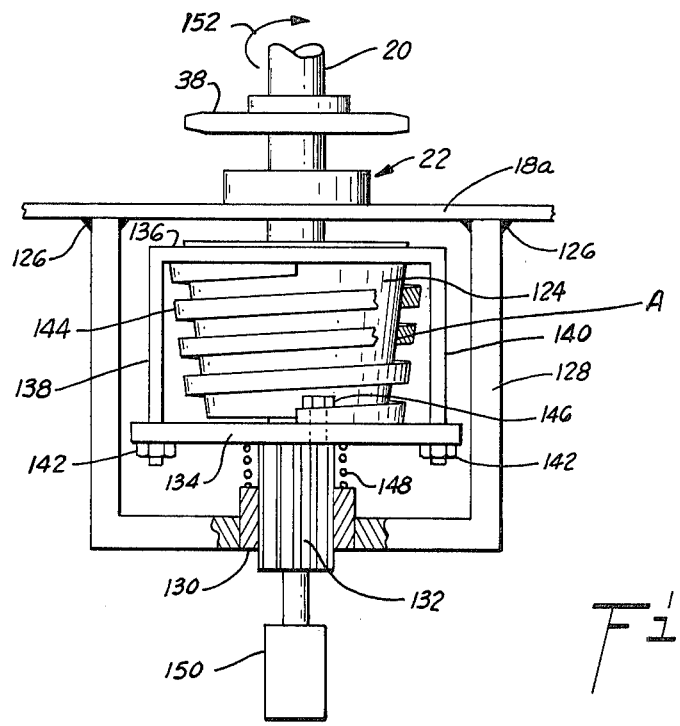
FIG. 5 is a plan view of an alternate form of latch mechanism for use in selectively restraining the main valve shaft against rotation, with the parts shown in gripping or latching configuration.

Referring first to FIGS. 1 and 3, there is shown a valve body 10 which is connected in a flow line (not shown) and supported on a valve support 12. The valve may be of any suitable type, but the preferred form is a full-ported plug or ball valve operable by rotation of its shaft 14 through an arc of 90° to open or close the valve.

The fast-acting valve operator comprising this invention for actuating the valve 10 is indicated generally at 16. Said operator is mounted in a support frame 18 including front and back mounting plates 18a and 18b and upper and lower plates 18c an 18d, respectively. As shown in FIGS. 1 and 3, the operator means includes a shaft 20 journaled in the front and back mounting plates 18a and 18b by ball bearings 22 including inner and outer ball races 24 and 26, respectively, and balls 28. The shaft 20 is operably connected to the valve shaft 14 by coupling 30, which may be a flexible-type coupling comprising two sprockets 32 and 34, one on shaft 20 and the other on shaft 14, with a double link chain 36 disposed about both sprockets. Such a flexible coupling permits some misalignment between the valve operator 16 and the valve 10 without interfering with their operation.

Referring now to FIGS. 2 and 3, there is shown the operator means by which shaft 20 is quickly rotated when it is desired to open the valve 10. Mounted on shaft 20 is a chain sprocket 38. Disposed about sprocket 38 is a chain 40 comprising a plurality of links 42 joined by rivets 44. In the preferred form, as shown in FIG. 2, the chain 40 engages sprocket 38 over approximately 180° of its circumference to provide an amplified contact area to assure proper transmission of forces and reduce bending and twisting moments on the shaft 20. The chain 40 also passes about an idler sprocket 46 which is free to rotate with an idler shaft 48 journaled in the support frame 18. The lower end of chain 40 is attached to a chain coupling 50 which includes a body portion 52 and an arm 54. The upper end of chain 40 is attached to chain tensioner 56 which includes a bolt 58 and nuts 60. Bolt 58 passes through an opening (not shown) in the arm 54 which extends from and is attached to the coupling 50, whereby the amount of tension in the chain 40 may be adjusted by adjusting the position of nuts 60 on bolt 58.

Actuator means are provided for moving the chain 40 relative to sprocket 38 to thereby rapidly rotate the shaft 20 to operate valve 10. In the preferred form, these comprise a power pneumatic cylinder and piston. As shown in FIG. 2, a cylinder 61 including cylindrical body 62 and forward and read end plates 63 and 64 is mounted on the frame 18 by four mounting brackets 65. Bolts 66 pass through the brackets 65 and corresponding horizontal slots 67 in mounting plate 18b and are held by nuts 68 behind plate 18b (FIG. 3). Four horizontal bolts 69 are threaded through brackets 70 on mounting plate 18b and engage the front and rear end portions 63 and 64, respectively of cylinder 61. Lock nuts 71 are provided on bolts 69 to lock them in position relative to brackets 70. As explained more fully hereinafter, this arrangement provides means whereby the position of the power cylinder 61 may be adjusted horizontally relative to the shaft 20 and sprocket 38 to vary the length of the piston stroke and thereby control the amount of rotation of shaft 20.

Fluid conduits 72 and 74 are connected respectively to the forward and rear end plates 63 and 64 of cylinder 61. The fluid conduits have their lower ends connected through a four-way valve 76 to a gas exhaust conduit 78 and a gas supply conduit 80. The gas supply conduit 80 is connected to a suitable source (not shown) of gas under pressure and includes a pressure regulator 82. Through this arrangement, gas under pressure can be supplied selectively to either end of cylinder body 62 while air is exhausted from the other end. Fluid conduit 74 also preferably includes a flow control valve 83 having an orifice and adjustable needle valve. As explained more fully hereinafter, flow control valve 83 may be used to control the speed of the return, or closing, stroke of the valve operator.

Slidably disposed in cylinder body 62 is a piston 84 having a stem 86, the rear end of which extends through rear plate 64 of the cylinder 61 and is connected to the chain coupling 50; so that as the piston moves forward in cylinder body 62 (to the left as viewed in FIG. 1), chain coupling 50 and the lower end of chair 40 will move forward, rotating sprocket 38 and shaft 20 in a clockwise direction to open the valve 10. Conversely, movement of the piston to the right (as viewed in FIG. 1) will rotate the shaft 20 in a counterclockwise direction to close valve 10. A compression coil spring 87 may be provided to assist the pneumatic pressurizing fluid in the forward, or opening, stroke of piston 84. Also, as is apparent, the spring 87 may, if made sufficiently strong, be wholly substituted for the pressurizing fluid. A sleeve 85 is disposed about stem 86 between the piston 84 and the rear wall 64 of the cylinder. As explained more fully hereinafter, sleeve 85 acts as a stop on piston 84 during the closing stroke of the valve operator.

As may be noted from FIG. 2, the lower end of chain 40, chain coupler 50 and piston stem 86 are all approximately in a straight line, which line is tangent to the sprocket 38. This arrangement prevents racking of the shaft 20 and also provides for maximum straight-line transmission of forces between the power piston 84 and the sprocket 38.

A dashpot, indicated generally at 88 and shown in enlarged detail in FIG. 4, is provided in the forward end plate 63 of cylinder 61 to smoothly terminate the forward travel of piston 84. As shown in FIG. 4, the end plate 63 includes a vertical bore 90 in communication with gas conduit 72 and a horizontal bore 92 in communication with bore 90 and the forward end of the cylinder chamber. Additional horizontal and vertical bores 94 and 96, respectively, of reduced diameter also communicate with vertical bore 90 and the forward end of the cylinder chamber. A screw 98 in end plate 63 is adjustable to further restrict flow through passages 94 and 96.

As the piston 84 nears the completion of its forward stroke, the forward end of piston stem 86 enters the horizontal bore 92, cutting off the principal means of egress for air remaining in the forward end of the cylinder chamber; which air then must bleed through reduced diameter passages 94 and 96. This provides an air cushion effect at the end of the forward stroke so that the piston stroke is terminated without shock. A positive stop on the forward piston motion is provided when the stem 86 contacts the back 92a of horizontal bore 92.

Means are provided for releasably restraining the valve operator means, including shaft 20, sprocket 38 and chain 40, against movement responsive to the actuator means of cylinder 61 and piston 84. In the preferred form of valve operator, restraining means comprise a projection or cam 100 secured to or formed on chain sprocket 38 and a pivoted trigger 102 adapted to releasably engage the cam 100. Hard metal inserts 101 and 103 are preferably provided on the cam and trigger, respectively, to provide the actual contact surfaces. The inserts may be mounted as by dovetail extensions on the inserts which engage dovetail slots on the cam and trigger. As shown in FIGS. 2 and 3, the trigger 102 is pivotally mounted on a stub shaft 104 carried by the forward plate 18a of frame 18, and is biased toward a position engaging cam 100 by coil expansion spring 106. The coil spring 106 has one end attached to the trigger 102 and the other end to a support stem 108 extending from plate 18a. While it is preferred that the restraining means be associated with the sprocket 38 of the operator means, it is apparent that restraining means with other parts of the operator means such as the chain 40 or shaft 20 or with a part of the actuator means such as the piston 84, stem 86, or chain coupling 50 would also function satisfactorily.

For releasing the restraining means, there is provided a control air cylinder 110 having gas supply conduit 112 and exhaust conduit 114. A piston 116 is slidable in the control cylinder 110 and has a stem 118 extending from the piston through the end of the cylinder and terminating in a resilient ball 120. When it is desired to release trigger 102, gas under pressure is applied through conduit 112 to move the piston 116 and stem 118 to the right, as viewed in FIG. 2, until the ball 120 contacts the lower end of trigger 102, pivoting it about shaft 104 in a counterclockwise direction and releasing the cam 100. A coil spring 122 is provided in cylinder 110 to return the piston to its original position once the supply of pressurizing gas is discontinued.

In operation, with the parts in the position shown in FIG. 2, the valve is closed. Power piston 84 is disposed approximately midway in cylinder body 62 and trigger 102 is in engagement with cam 100 on the chain sprocket 38 to prevent clockwise rotation of the shaft 20. To cock the valve, four-way valve 76 is adjusted so that gas under pressure from conduit 80 is fed through conduit 74 and control valve 83 into the right-hand side of cylinder body 62 behind the piston 84. The presence of pressurizing fluid behind the piston 84 will urge the piston forward in the power cylinder (in a direction to open the valve 10) but latch trigger 102 engaging cam 100 will restrain such movement. The valve operator, once cocked, may remain in that condition indefinitely. However, when it is desired to open the valve 10, pressurizing fluid is supplied through conduit 112 into the portion of the control cylinder 110 behind piston 116 to thereby urge the piston 116 forward, causing ball 120 to strike the trigger 102 and release the cam 100, as described above. When the trigger is released, the piston 84 and stem 86 will move forward within the cylinder 61 very rapidly responsive to the expansion of the compressed gas in the cylinder. By providing a relatively large volume of compressed gas behind the piston 84 when it is in its cocked position, a pneumatic spring effect is achieved whereby when the piston is released, its forward movement is due principally to the expansion of gas already in the cylinder rather than to the admission of additional pressurizing gas. This provides for an extremely fast movement of the piston and concomitantly rapid movement of the chain 40 about sprocket 38 to rotate sprocket 38 and shaft 20 in a clockwise direction.

Since, as explained above, the chain 40 engages sprocket 38 over approximately 180°, a large force transmitting area is made available, and additionally the torques on shaft 20 are somewhat balanced; thus reducing the tendency to displace, bend or twist the shaft 20. Also, as noted above, the straight-line transmission of forces from the power piston 84 to the sprocket 38 along a line tangential to the circumference of sprocket 38 provides for maximum mechanical advantage.

At the completion of its stroke, the forward motion of piston 84 is cushioned by the dashpot 88 and finally terminated by the forward end of stem 86 seating fully in the horizontal bore 92 as explained above. The distance of travel of piston 84 in the cylinder 61 is such that one complete stroke of the piston will rotate the shaft 20 through a 90° arc, so as to move the valve 10 from a fully closed to a fully open position. To adjust the length of the actuating piston stroke, the position of the cylinder 61 may be adjusted horizontally by means of its mounting on plate 18b. The nuts 68 on mounting bolts 66 are loosened so that the bolts may slide horizontally in slots 67. The horizontal bolts 69 are then adjusted in their brackets 70 to horizontally position the cylinder 61. Once the cylinder is adjusted for the proper stroke of piston 84, bolts 68 are retightened so that the cylinder will remain stationary during operation.

To close the valve 10, the position of four-way valve 76 is reversed so that pressurizing air from conduit 80 is supplied to the left-hand side of cylinder body 62 through conduit 72 while air is exhausted from the right-hand side of the cylinder through conduits 74 and 78. This causes the piston 84 to move back or to the right, as viewed in FIG. 2, rotating shaft 20 in a counterclockwise direction and closing valve 10. The adjustment of the needle valve within speed control valve 83 controls the rate of return of the piston since it controls the rate at which gas can be exhausted through conduit 74. Since, as discussed above, the movement of piston 84 to open the valve 10 is due to the expansion of gas already within the power cylinder, the control valve 83 does not affect the speed with which the valve opens, only the speed at which it closes.

A stop on the closing movement is provided by sleeve 85 on piston stem 86 which will engage the end plate 64 of cylinder 62 to terminate movement of the piston. The sleeve 85 is dimensioned to allow for a slight overdisplacement to assure that the trigger 102 will engage the cam 100. Then, as pressurizing gas is again admitted to the right-hand side of cylinder body 62 to cock the valve operator, the piston will again move to the position shown in FIG. 2.

Figure 6:
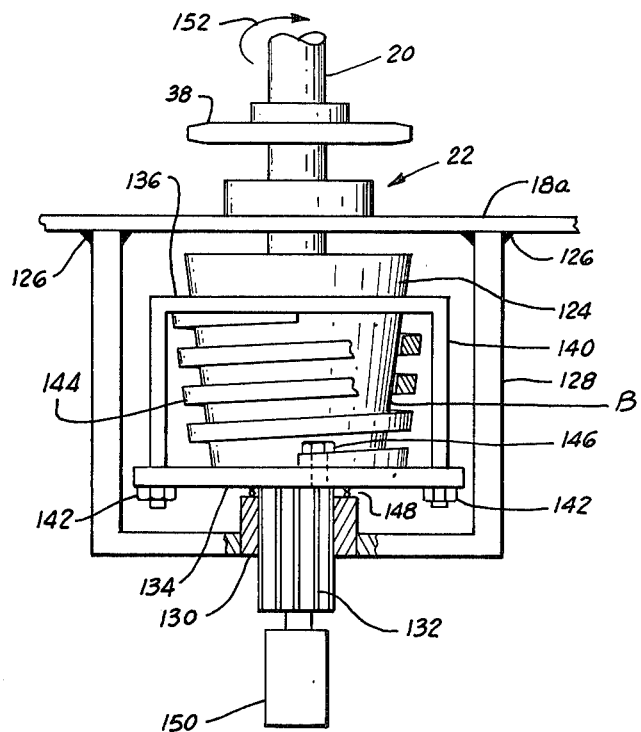
FIG. 6 is a plan view of the latch of FIG. 5 but with parts shown in nongripping configuration.

An alternate form of restraining means for restraining the valve operator means including shaft 20 and sprocket 38 against rotation in a direction to open the valve is shown in FIGS. 5 and 6. Referring to FIG. 5, there is shown the shaft 20 with sprocket 38 thereon, journaled in ball bearing 22 mounted on the front wall 18a of the valve operator support frame. However, in this alternative form, the shaft 20, instead of terminating at the ball bearing 22, extends through the bearing 22 and wall 18a and has disposed on its outer end a tapered drum or hub 124. Mounted on the outside of frame wall 18a, as by welds 126, is a rectangular housing 128 supporting in its central wall a nonrotating splined collar 130. Slidably disposed in collar 130 is a splined shaft 132 having secured to its inner end a mounting plate 134. A coil retainer assembly 136 is mounted on plate 134 by means of its two legs 138 and 140, respectively, which pass through bores in the mounting plate 134 and are threaded at their lower ends to receive nuts 142. Confined between retainer assembly 136 and mounting plate 134 is a square-cut coil spring 144 which is coiled about the periphery of tapered hub 124 of shaft 20. The outer end of coil spring 144 is secured to mounting plate 134 by bolt 146, while the upper end is free to move within retainer assembly 136. The tension in coil spring 144 may be adjusted by adjusting the position of nuts 142 so as to compress or extend the effective length of spring 144.

Means are provided for normally urging the coil 144 into engagement with hub 124. These preferably comprise a second coil spring 148 disposed about splined shaft 132 and confined between the inner surface of splined collar 130 and the outer surface of mounting plate 134. Spring 148 normally urges the mounting plate, spring retainer assembly 136 and coil spring 134 inwardly so that the inner periphery of coil spring 144 will engage the outer surface of hub 124 as shown at A in FIG. 5.

Means for moving the coil 144 out of engagement with hub 124 are provided by a solenoid 150 which, when actuated, will overcome the force of coil spring 148 and move the coil 144, coil retainer assembly, coil mounting plate and splined shaft 132 outwardly so that the coil spring 144 clears hub 124, as shown at B in FIG. 6.

The manner in which this alternate restraining means operates is as follows: With the parts positioned as shown in FIG. 5, the shaft 20 and sprocket 138 are restrained against rotation in a direction to open the valve. The direction of opening rotation is indicated by the bold arrow 152. However, any tendency toward rotation in this direction will merely cause the spring 144, which is engaging hub 124, to wrap more tightly about the hub 124. Since the spring and its retainer assembly are unable to rotate, this effectively prevents rotation of the shaft and sprocket in the direction of arrow 152. However, the shaft and sprocket are free to rotate in the opposite direction since this will tend to unwind the spring 144 and loosen its grip on the hub 124. Therefore, when engaged, the restraining means prevents rotation in a direction to open the valve but permits in a direction to close the valve.

When the valve operator has been "cocked" as heretofore explained, and it is desired to release the shaft 20 and sprocket 138 so that the valve may open, solenoid 150 is actuated to move the parts into the position shown in FIG. 6 so that spring 144 will clear hub 124 and permit its free rotation in a direction to open the valve.

Figure 7:
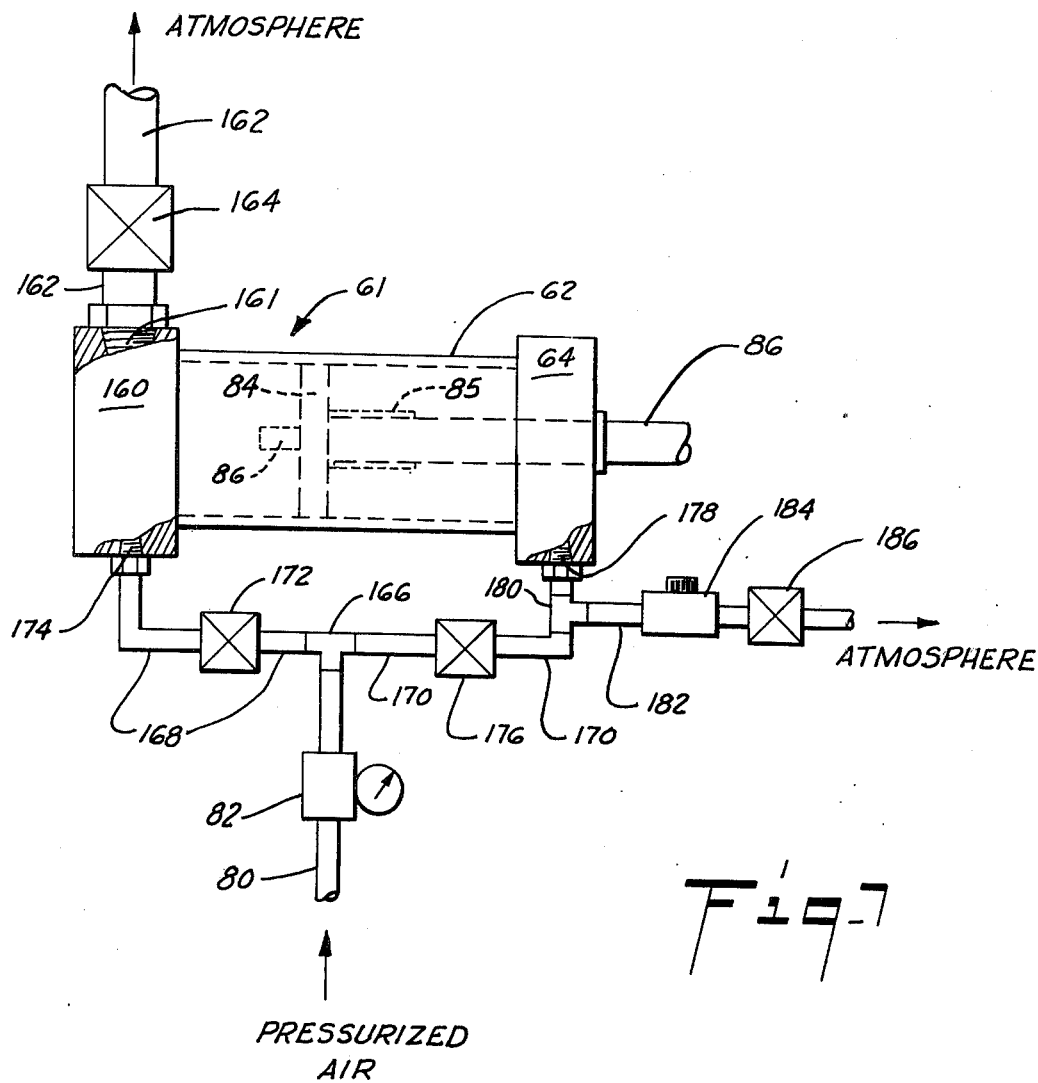
FIG. 7 is a somewhat diagrammatic illustration, with portions in section, of the actuator means of the valve operator of FIG. 1 illustrating an alternate means for restraining and releasing the actuator means.

In FIG. 7 is shown a still further alternate form of means for releasable restraining the valve operator.

This alternative means utilizes pneumatic pressure for releasably restraining the operator means as opposed to the mechanical trigger and cam latch of FIG. 2, or the hub and spring mechanism of FIGS. 5 and 6.

Referring now to FIG. 7, there is shown the actuating cylinder 61 with internal piston 84 having piston stem 86 which is suitably connected to the operator means for operating the valve between closed and open positions. The cylinder has a modified forward end plate 160, oversized exhaust port 161 and exhaust line 162. Exhaust line 162 has therein a special high-speed solenoid valve 164 with the exhaust or downstream side of valve 164 leading through exhaust line 162 to atmosphere. Pressurizing fluid is supplied to the cylinder 61 through gas supply conduit 80 which is connected to a suitable source (not shown) of gas under pressure and includes pressure regulator 82. Supply conduit 80 is branched at tee 166 to form dual gas supply conduits 168 and 170 with conduit 168 passing through solenoid valve 172 and into forward cylinder end plate 160 through port 174. Supply conduit 170 leads through solenoid valve 176 and into rear cylinder end plate 64 through port 178. Gas supply line 170 also includes, in the portion between solenoid valve 176 and port 178, a tee 180 from which branches exhaust conduit 182 which leads through speed-regulating valve 184 and solenoid valve 186 to suitable exhaust to atmosphere. Suitable control means (not shown) are provided for selectively operating the solenoid valves 164, 172, 176 and 186.

Operation of the valve operator utilizing the pneumatic restraining means is as follows: Beginning with all solenoid valves closed, valves 172 and 186 are opened simultaneously. This admits pressurizing gas through line 168 and port 174 into the forward end of cylinder 61 (to the left of piston 84 as viewed in FIG. 7). This will move the piston to the right as viewed in FIG. 7, with air in the cylinder to the right of piston 84 being forced out through port 178, exhaust conduit 182, speed-control valve 184, and solenoid valve 186 to vent to atmosphere. Speed-control valve 184 may be adjusted to control the rate at which air may be evacuated, thereby controlling piston speed and avoiding shock to the mechanism. As piston 84 and piston stem 86 move to the right, sprocket 38 and shaft 20 are rotated in a counterclockwise direction to close the valve 10 as discussed above. The travel of piston 84 is stopped when sleeve 85 around piston stem 86 engages the rear cylinder end plate 64. When piston travel stops, solenoid valve 186 is closed and valve 176 is opened to admit pressurizing gas through conduit 170, valve 176 and port 178 into the bore of cylinder 62 behind piston 84 (to the right of piston 84 as viewed in FIG. 7). At this point, both valves 172 and 176 are open, the other solenoid valves are closed, and pressurizing gas at equal pressure is present on both sides of piston 84. However, the area on which the pressurizing fluid acts on the forward, or left-hand side, of piston 84 is equal to the full face area of the piston including piston stem 86, while the area on which the pressurizing fluid acts on the back side of piston 84 is equal to the piston face area reduced by the area of piston stem 86. This difference in area results in a net force to the right as viewed in FIG. 7 which keeps the piston in its fully retracted position.

The valve operator is now cocked and may remain in that position indefinitely. When it is desired to rapidly open the valve 10, solenoid valve 172 is closed shutting off the supply of pressurizing fluid to the forward end of cylinder 61 and solenoid valve 164 is opened, permitting the rapid venting of the pressurizing gas on the forward side of piston 84 through exhaust line 162 to atmosphere. The compressed gas confined on the rear side of piston 84 then expands to rapidly move the piston forward in cylinder 61 to open valve 10 as explained above.

In addition to the two mechanical and one pneumatic restraining mechanisms illustrated, other forms are of course possible, as, for example, a magnetic clutch assembly between the shaft 20 and some stationary portion of the valve operator support frame.

FIGS. 8 and 9 illustrate an alternate form of operator means which utilizes two aligned sprockets and an endless chain. Referring to FIG. 8, there is shown the main shaft 20 which rotates valve 10 between open and closed positions. As described in connection with the FIG. 2 embodiment, shaft 20 is suitably journaled in the frame 18 of the valve operator and has thereon a chain sprocket 38. An idler sprocket 246 is also provided on idler shaft 248 also journaled in valve operator frame 18. Journaled about drive sprocket 38 and idler sprocket 246 is an endless chain 240 composed of individual links 242 connected by pins 244. A U-shaped traveler car 190 is connected to piston stem 86. The open side of the U faces up so that endless chain 240 may nest inside the car 190. The end of the car distant from piston stem 86 is attached to endless chain 240 by means of pins 192 which pass through the traveler car and chain. The traveler car is supported from below by linear bearing surface 194, attached to the main valve operator frame 18 by supports 196. Keying means (not shown) may be provided between traveler car 190 and linear bearing 194 to keep the two properly aligned during horizontal movements of the traveler car.

As in the FIG. 2 embodiment above, a cam 100 is provided for engagement by trigger 102 to releasably restrain drive sprocket 38 and shaft 20 from rotation in a direction to open valve 10. While the cam 100 is shown mounted on drive sprocket 38, it may of course be mounted directly on drive shaft 20.

A slight modification of the trigger 102 is also shown in FIG. 8. A roller 198 is mounted on roller bearings 200 near the end of the horizontal portion of trigger 102 in place of the hard metal inserts shown in FIG. 2. The frictionless roller 198 engages the cam 100 to prevent operation of the valve when the valve operator is in a cocked position (as shown in FIG. 8) and rolls into a releasing position when the trigger is released by actuation of control cylinder 110 (as shown in FIG. 9). The use of roller 198 in place of the hard metal inserts of FIG. 2 has the advantage of virtually eliminating wear between the cam 100 and trigger 102 at the expense of a slight increase of fabrication cost.

When the ball 120 provided on the end of piston stem 118 of control cylinder 110 engages the trigger 102 as shown in FIG. 9, a downward loading is generated on the ball 120 and stem 118. Therefore, a linear bearing 202 may be provided under ball 120 to carry this loading and prevent eventual damage to the piston stem 118. A positive stop 204 limits rotational movement of the trigger 102 to prevent overstretching of the return spring 106.

The valve operator functions in the same manner utilizing the alternate operator means of FIGS. 8 and 9 as previously described in connection with the FIG. 2 embodiment. The movements of piston stem 86 responsive to pressurizing fluid in cylinder 61 are transmitted through traveler car 190 to endless chain 240 to thereby close or open valve 10 by rotating the drive sprocket 38 and drive shaft 20. With the parts in the position shown in FIG. 8, roller 198 of trigger 102 is in engagement with cam 100 preventing the drive sprocket 38 and shaft 20 from rotating in a clockwise direction to open valve 10. Pressurizing gas may then be admitted to cylinder 61 behind piston 84 to urge the piston forward and place piston stem 86 and traveler car 190 in tension. When it is desired to operate the valve, pressurizing fluid is supplied to control cylinder 110 behind piston 116 to urge the piston 116 forward, causing ball 120 to strike trigger 102 and release the cam 100, whereupon the piston 84 and stem 86 in cylinder 81 may move forward responsive to the expansion of compressed gas behind the cylinder. This causes piston stem 86 and traveler car 190 to move forward (to the left as viewed in FIG. 8) very rapidly, thereby rotating chain 240 about sprockets 38 and 246, at the same time causing drive shaft 20 to rotate in a clockwise direction approximately 90° to open valve 10. With the valve in full open position, the parts are positioned as shown in FIG. 9.

The double sprocket and endless chain operator means of FIG. 8 has certain advantages over that of the FIG. 2 embodiment in that the chain coupling 50 with its cantilevered arm 54 of FIG. 2 is eliminated and the two equal-size sprockets provide for smoother operation with less whipping of the piston stem 86. By using the traveler car 190 with linear bearing 194, all forces between piston stem 86 and endless chain 240 are kept linear with the piston stem travel and shocks induced by operation of the valve operator are distributed and partially dissipated by transmitting them through the linear bearing 194 and supports 196 to the operator frame 18.

While the valve operator has been described in terms of quick-opening a valve, it is apparent that it could also be used for quick-closing a valve, or, by employing two restraining or latch mechanisms, for both quick-opening and quick-closing of a valve.

The foregoing disclosure and description of the invention are illustrative and explanatory thereof, and various changes in the size, shape and materials, as well as in the details of the illustrated construction, may be made within the scope of the appended claims without departing from the spirit of the invention.

What is claimed is:

1. A fast operator for operating a movable element, said operator comprising:
   operator means connectible to said movable element;
   pneumatically powered actuator means connected to said operator means for moving said operator means rapidly in one direction;
   fluid conduit means for admitting compressed pneumatic pressurizing fluid to said actuator means for powering said actuator means;
   restraining means for preventing movement of said actuator means and said operator means in said one direction during and after admission of said compressed pneumatic pressurizing fluid, to place and maintain said actuator means in a fully pressurized cocked condition until released; and
   release means unaffected by the admission of said pneumatic pressurizing fluid to said actuator means co-acting with said restraining means and selectively operable to essentially instantaneously release said restraining means,
   release of said restraining means permitting said compressed pressurizing fluid to expand and rapidly move said actuator means to thereby impart rapid movement in said one direction to said operator means, and
   valve means operable to vent said pneumatic pressurizing fluid from said actuator means after each actuation thereof, whereby said actuator means may be easily returned to its original position without overcoming the opposing force of said pressurizing fluid.

2. The fast operator of claim 1, wherein expansion of said compressed pneumatic pressurizing fluid admitted to said actuator means prior to the release of said restraining means provides the principal power for moving said actuator means rapidly in said one direction.

3. The fast operator of claim 1 comprising additionally,
   control means for controlling the operation of said release means independently from the admission of said pneumatic pressurizing fluid to said actuator means, and
   wherein said restraining means comprise instantaneously releasable mechanical latch means for restraining movement of such actuator means and said operator means in said one direction.

4. The operator of claim 3 wherein said actuator means comprises:
   a cylinder, and
   a piston, having one end exposed to said pneumatic pressurizing fluid, slidable in said cylinder and having a piston stem connected to said operator means.

5. The operator of claim 4, wherein said fluid conduit means includes means for introducing said pneumatic pressurizing fluid into said cylinder on the side of said piston opposite that which was exposed to the pressurizing fluid to effect actuation of the operator means, whereby said fluid may selectively return the piston to its starting position, and
   wherein said valve means comprise four-way valve means for simultaneously venting said pneumatic pressurizing fluid from said cylinder on one side of said piston and admitting said pneumatic pressurizing fluid to said cylinder on the other side of said piston.

6. The valve operator according to claim 5 wherein said restraining means comprise differential areas on said piston exposed to said pressurizing fluid and said release means comprise valve means for rapidly venting said pressurizing fluid from said cylinder on one side of said piston to permit said piston to move rapidly in a direction to open said valve.

7. A fast-acting operator for a rotary valve having a shaft controlling its opening and closing, said valve operator comprising:
   rotatable means connectible to the valve shaft for imparting rotation thereto,
   pneumatically powered actuator means having an operable connection with said rotatable means for imparting rotation thereto,
   fluid conduit means associated with said actuator means for admitting compressed pneumatic pressurizing fluid to said actuator means,
   restraining means for restraining movement of said rotatable means and said actuator means in a direction to open said valve at all times during and after admission of said compressed pneumatic pressurizing fluid to place and maintain said actuator means in a fully pressurized cocked condition until released, release means unaffected by the admission of said compressed pressurizing fluid to said actuator means co-acting with said restraining means and selectively operable to suddenly release said restraining means to allow the cocked actuator means to move rapidly responsive to expansion of said pressurizing fluid to thereby rapidly rotate said rotatable means to open said valve, means for returning said actuator means to its starting position, and valve means associated with said actuator means for venting said pneumatic pressurizing fluid from said actuator means after each actuation of said operator means whereby said return means can return said actuator means to its original position without overcoming the opposing force of said pressurizing fluid.

8. The valve operator according to claim 7 wherein expansion of said compressed pneumatic pressurizing fluid admitted to said actuator means prior to the release of said restraining means provides the principal power for moving said actuator means in a direction to rotate said rotatable means to open said valve.

9. The fast operator of claim 7 comprising additionally:

control means for controlling the operation of said release means independently from the admission of said pressurizing fluid to said actuator means.

10. The operator of claim 7 wherein said rotatable means comprises a shaft connectible to said rotary element, a toothed sprocket on said shaft and a chain engaging the teeth of said sprocket and connected to said actuator means.

11. The valve operator of claim 10 wherein one end of said chain is connected to said actuator means and wherein said end of said chain and said actuator means lie in a straight line, which line is approximately tangential to the circumference of said sprocket.

12. The operator of claim 10 wherein said operator includes a frame having a linear bearing surface and wherein said chain is connected to said actuator means by a traveler car movable along said linear bearing surface.

13. The valve operator according to claim 7 wherein said actuator means includes a compression spring for assisting said pneumatic pressurizing fluid in powering said actuator means in a direction to open said valve.

14. A fast-acting operator for a valve having a shaft controlling its opening and closing, said operator comprising:

rotatable means connectible to the valve shaft for imparting rotation thereto, movable actuator means having an operable connection with said rotatable means for imparting rotation thereto, said actuator means being at least partially pneumatically powered in a direction to rotate said rotatable means to open said valve, fluid conduit means associated with said actuator means for admitting pneumatic pressurizing fluid to said actuator means while said actuator means is restrained against movement in a direction to open said valve to thereby place said actuator means in a pressurized cocked condition, restraining means associated with one of said rotatable means and said actuator means to restrain movement of said rotatable means and movement of the actuator means connected therewith to maintain a valve in a closed position, said restraining means comprising a projection on the rotatable means and a pivoted latch element engageable with said projection to prevent rotation in a direction which would open said valve, and means associated with said restraining means for suddenly releasing the restraining means to allow the cocked actuator means to rapidly move responsive to said admitted pressurizing fluid to thereby rapidly rotate the rotatable means to open the valve.

15. The fast-acting valve operator of claim 14 wherein said releasing means comprises a pneumatic piston and cylinder arrangement for pivoting said latch element from a first position engaging said projection to a second position permitting rotation of said rotatable means.

16. The fast-acting valve operator of claim 14 wherein one of said projection and said pivoted latch include anti-friction means for reducing friction between said latch and said projection when said latch is actuated to release said restraining means.

17. The fast-acting valve operator according to claim 16 wherein said anti-friction means comprise a roller carried by said pivoted latch.

18. The valve operator according to claim 14 wherein said means for suddenly releasing said restraining means comprises, a pneumatic cylinder, a piston slidable in the bore of said cylinder and having a piston stem thereon, means on said piston stem for engagement with said restraining means to move said restraining means from a first position restraining said rotatable means against movement to a second position permitting said rotatable means to rotate in a direction to operate said valve.

19. A fast-acting valve operator as set forth in claim 14 wherein the restraining means comprises a hub on said rotatable means, a coil disposed about said hub, and means for normally urging said coil into engagement with said hub to restrain rotation of said rotatable means in a direction to open said valve while permitting rotation in a direction to close said valve.

20. An apparatus comprising:

a valve movable from closed to open positions; and a valve operator for said valve, said valve operator comprising:

operator means connected to said valve so that actuation of said operator means opens and closes said valve, pneumatically powered actuator means connected to said operator means for actuating the same to open and close said valve;

fluid conduit means communicating with said actuator means for admitting compressed pressurizing fluid to said actuator means to power said actuator means in a direction to open said valve;

valve means in said fluid conduit means movable between a first position supplying said compressed pneumatic pressure fluid to said actuator means and a second position venting said pneumatic pressurizing fluid from said actuator means;

restraining means for preventing movement of said actuator means in a direction to open said valve during and after admission of said pneumatic pressurizing fluid to place and maintain said actuator means in a fully pressurized cocked condition until released, and independent release means unaffected by the admission of pressurizing fluid to said actuator means co-acting with said restraining means for selectively and essentially instantaneously releasing said restraining means to permit said pneumatic pressurizing fluid to impart rapid motion to said actuator means and to said operator means to thereby impart a rapid opening movement to said valve, and means for returning said actuator means to its original position while said valve means in said fluid conduit means is in said second position venting said actuator means.

21. The apparatus according to claim 20 wherein expansion of pressurizing fluid admitted to said actuator means prior to release of said restraining means provides the principal power for movement of said actuator means in a direction to open said valve.

22. The method for operating an operator for a movable element of the type having operator means connectible to the element, pneumatically powered actuator means connected to the operator means, fluid conduit means for admitting pneumatic pressurizing fluid to the actuator means, valve means associated with said actuator means for selectively venting said pneumatic pressurizing fluid from said actuator means, restraining means for preventing movement of the actuator means and operator means, until released, release means for releasing the restraining means, and means for returning said actuator means to its original restrained position, said method comprising:

engaging said restraining means to prevent movement of said actuator means and said operator means in a direction to operate said movable element;

admitting compressed pneumatic pressurizing fluid to said actuator means through said fluid conduit means while continuing to restrain said actuator means and operator means against movement responsive to said admitted pressurizing fluid, to thereby place said actuator means in a fully pressurized cocked condition;

maintaining said actuator means in said fully pressurized cocked condition until operation of said movable element is desired;

releasing said restraining means to permit said compressed pneumatic fluid to move said actuator means rapidly in a direction to move said operator means to operate said movable element;

venting said pneumatic pressurizing fluid from said actuator means through said valve means after actuation of said operator means;

returning said actuator means to its starting position; and repeating said cycle.

* * * * *